US007265753B1

(12) United States Patent
Zareski et al.

(10) Patent No.: US 7,265,753 B1
(45) Date of Patent: Sep. 4, 2007

(54) PARTICLE TRACING WITH ON-DEMAND MESHING

(75) Inventors: David Zareski, Exton, PA (US); Peter Segal, West Chester, PA (US)

(73) Assignee: Bentley Systems, Inc., Exton, PA (US)

( * ) Notice: Subject to any disclaimer, the term of this patent is extended or adjusted under 35 U.S.C. 154(b) by 134 days.

(21) Appl. No.: 10/314,271

(22) Filed: Dec. 9, 2002

(51) Int. Cl.
*G06T 5/00* (2006.01)
*G06T 17/00* (2006.01)
*G06T 15/50* (2006.01)
*G06T 15/60* (2006.01)

(52) U.S. Cl. .................. 345/426; 345/419; 345/420
(58) Field of Classification Search ........ 345/426–428, 345/419, 421–424
See application file for complete search history.

(56) References Cited

U.S. PATENT DOCUMENTS

| | | | | |
|---|---|---|---|---|
| 5,283,860 A | * | 2/1994 | Einkauf et al. | 345/624 |
| 5,488,700 A | * | 1/1996 | Glassner | 345/426 |
| 5,704,024 A | * | 12/1997 | Voorhies et al. | 345/426 |
| 5,734,385 A | * | 3/1998 | Mima | 345/426 |
| 5,966,133 A | * | 10/1999 | Hoppe | 345/420 |
| 6,016,150 A | * | 1/2000 | Lengyel et al. | 345/426 |
| 6,226,005 B1 | * | 5/2001 | Laferriere | 345/426 |
| 6,252,608 B1 | * | 6/2001 | Snyder et al. | 345/473 |
| 6,359,618 B1 | * | 3/2002 | Heirich | 345/426 |
| 6,487,322 B1 | * | 11/2002 | Bastos et al. | 382/274 |
| 6,697,063 B1 | * | 2/2004 | Zhu | 345/421 |
| 6,825,840 B2 | * | 11/2004 | Gritz | 345/426 |
| 6,853,377 B2 | * | 2/2005 | Pharr | 345/426 |
| 2002/0080143 A1 | * | 6/2002 | Mogran et al. | 345/581 |
| 2002/0089501 A1 | * | 7/2002 | Tampieri | 345/426 |
| 2002/0118190 A1 | * | 8/2002 | Greasley | 345/426 |
| 2003/0011596 A1 | * | 1/2003 | Zhang et al. | 345/426 |
| 2003/0234789 A1 | * | 12/2003 | Gritz | 345/474 |
| 2004/0001062 A1 | * | 1/2004 | Pharr | 345/426 |
| 2004/0125103 A1 | * | 7/2004 | Kaufman et al. | 345/419 |
| 2005/0046639 A1 | * | 3/2005 | Leather | 345/584 |
| 2005/0074145 A1 | * | 4/2005 | Liu et al. | 345/473 |
| 2005/0116950 A1 | * | 6/2005 | Hoppe | 345/423 |

OTHER PUBLICATIONS

"Shadow Volume Reconstruction from Depth Maps", McCool, ACM Transactions on Graphics, vol. 19, No. 1, Jan. 2000.*
"Global Illumination Using Local Linear Density Estimation", Walter et. al., ACM Transactions on Graphics, vol. 16, No. 3, Jul. 1997.*

(Continued)

*Primary Examiner*—Kee M. Tung
*Assistant Examiner*—Eric Woods
(74) *Attorney, Agent, or Firm*—Venable, LLC; Jeffri A. Kaminski; Caroline J. Swindell

(57) ABSTRACT

A method of rendering computer graphics is disclosed comprising the steps of: processing a set of light particles in a scene to be rendered; selecting a view of the scene, where the view comprises at least one surface, the surface comprising a plurality of pixels; selecting a pixel to render in the view; determining whether an illumination mesh already exists for a surface comprised of the selected pixel; computing an illumination mesh for the surface, when the illumination mesh does not already exist; and rendering the pixel with the illumination mesh.

19 Claims, 3 Drawing Sheets

OTHER PUBLICATIONS

"White Papers: Inspirer". Integra company website, from archive.org, dated to Feb. 11, 2001.*

RenderPark Users Guide. RenderPark Software. Archive.org, dated to Oct. 14, 2001.*

P. Slusallekm M. Stamminger, W. Heidrich, J-C. Popp, and H. Seidel. "Composite Lighting Simulations with Lighting Networks". Mar./Apr. 1998, IEEE Comp. Graph & Architect., pp. 22-31.*

Bruce Walter, Phillip M. Hubbard, Peter Shirley, and Donlad P. Greenberg. "Global Illumination Using Local Linear Density Estimation." ACM Transaction on Graphics, vol. 16, No. 3, Jul. 1997, pp. 217-259.*

Jensen, Henrik Wann. 1997. "Global Illumination using Photon Maps". pp. 1-17. extended version of Rendering Techniques '96 (Proc. 7th Eurographics Workshop on Rendering).*

El-Sana, Jihad. Neta Sokolovsky, Claudio T. SIlva. "Integrating Occlusion Culling with View-Dependent Rendering." pp. 371-380, Proc. IEEE Conf. on Visualization 2001.*

* cited by examiner

PARTICLE TRACING WITH ON-DEMAND MESHING

BACKGROUND OF THE INVENTION

1. Field of the Invention

The present invention relates generally to computer rendering of graphics, and more particularly to rendering by particle tracing in a computer aided design (CAD) environment.

2. Related Art

Rendering is the process of depicting a realistic three-dimensional (3D) model on a computer through the display of shaded surfaces applied to an outline drawing. Images produced via rendering are photo-realistic images. These photo-realistic images may be used to simulate the appearance of a proposed architectural design and to create interactive walkthroughs and animations for the proposed design. Ray tracing, radiosity and particle tracing are among the techniques used to render photo-realistic images.

Ray tracing is a photo-realistic rendering method in which an image is generated by simulating the reflections of light rays in a 3D scene. In the real world, light rays are emitted by one or many light sources and reflect off objects until they finally reach the eye. On a computer, it is often more efficient to trace rays from the eye, rather than from the light sources. This can save a significant amount of time by not following rays from light sources to surfaces that are never seen in the image.

Ray tracing follows rays backward from the eye into the scene, determining what is visible. Rays of light are traced from the viewer's eye (the camera position) through each pixel that comprises the image in the view.

Tracing a ray involves testing all objects in a scene for intersection with that ray. For these initial rays, often referred to as primary rays or eye rays, the nearest, intersection along each ray must be computed and the entire design must be examined to find the nearest of all the intersections along the ray. Hidden surface removal is performed by this procedure. Once it is determined what surfaces are visible, the illumination and shading of the visible objects is computed.

The shading of the visible surface is computed for each pixel. The color of the surface is composed of three components—ambient, local, and global illumination—which are added together.

Ambient illumination is surface lighting not directly attributed to any particular light source. Ambient light brightens a scene in areas where there is little or no lighting.

Local illumination is surface shading directly attributed to light sources. Local illumination is made up of diffuse and specular components. The diffuse component is the light that directly strikes a surface. It is view-independent. The specular component creates a bright highlight in the reflected direction of the light on objects with glossy surfaces. Specular highlights are view-dependent.

Global illumination is shading on a surface due to secondary (global) effects such as reflections and transparency.

To determine the illumination a surface receives from the reflected and refracted directions, secondary rays are traced in those directions. For efficiency, rays are only traced if the surface is actually reflective or transparent. Each reflected or transmitted ray is treated as a primary ray in that the nearest intersection along the ray must be computed. Similarly, the surfaces that these rays "see" must be shaded as described above. This process is repeated recursively until a defined limit is reached or the accumulated reflectivity or transparency drops below a given threshold.

Radiosity is another technique used in rendering. Radiosity is defined in the terminology of physics as the total power leaving a point on a surface, per unit area on the surface. In the context of rendering, "power" is light energy.

Radiosity solving is a sophisticated technique that calculates the light that is reflected between diffuse surfaces. It can be used to demonstrate effects such as color bleeding, where one colored surface lends a tint to another nearby surface, and light dispersion, the reflection of indirect light onto other surfaces in a scene. In comparison, ray tracing simulates the specular reflection of rays of light in a scene.

Radiosity solving, unlike ray tracing, is not a rendering technique on its own, it merely generates a lighting solution that in turn can be rendered. In fact, radiosity solving and ray tracing capabilities can be used together to produce realistic images with the best qualities of both methods. Radiosity solving operates as a rendering pre-process that computes the global, view independent (diffuse) lighting solution. Ray tracing uses this radiosity solution to render a view dependent image, adding specular highlights and reflections.

The radiosity solving process produces useful intermediate solutions in a short amount of time. It then automatically and continuously refines them into the final solution. This makes it possible to display intermediate results so that a user can then decide when the solution is satisfactory and stop the calculations.

Particle tracing, like radiosity solving, calculates a lighting solution, which is then rendered. Because a total lighting solution is calculated, particle traced solutions are view independent. That is, once a particle traced solution of a model is present in memory, different views of the model can be rendered using the current lighting solution. These subsequent renderings are much quicker because the existing lighting solution is used.

Where required, these views can be ray traced to display caustics. Caustics are the lighting effects caused by light reflected off surfaces or refracted through transparent objects, such as light reflected off a mirror or focused though a lens. A caustic reflection differs from a ray-traced reflection in that the caustic reflection adds light to the surface receiving the caustic, whereas the ray-traced reflection just shows what the viewer would see. Examples of caustics include specular highlights, transparency, refraction and reflection.

When a model is ray traced, a picture of what can be seen from the view camera's eyepoint is produced. Reflections in shiny elements, and refraction through transparent objects are visible. The effects of diffuse and specular light reflecting, or "bouncing," off these elements and adding to the lighting of other elements in the model are not visible. Both radiosity and particle tracing account for the effects of diffuse reflection of light, but only particle tracing accounts for the specular reflection of light as well. Both radiosity and particle tracing rendering modes may use ray tracing of the final display in order to view the reflection of objects in shiny surfaces, and the refraction of light through transparent objects.

Whereas, ray tracing traces the path of light rays from the eyepoint back into the scene, particle tracing calculates the path of light particles as they reflect around the scene.

Particle tracing works by calculating the paths of light particles as they are emitted from light sources and are reflected and transmitted throughout the scene. The process typically occurs in three distinct phases: particle processing, meshing, and rendering. In conventional particle tracing, only after the particle processing and meshing phases are performed can rendering be done.

The three steps conventional particle tracing systems perform to render images are shown in FIG. 1. Starting with an un-rendered scene, in step 102, conventional systems first perform particle processing in step 104, also known as particle shooting. During the particle processing step, light particles are distributed among the light sources, and then the paths of the light particles from the light sources are traced through the scene, interacting with the surfaces encountered along the way.

In step 106, the illumination of the surfaces the particles encounter is determined. This is referred to as meshing, because this illumination information is stored at select "mesh" points on each surface. After meshing is performed for all the surfaces in the scene, whether visible in a selected view or not, the scene is rendered in step 108 using the illumination information from the meshing step 106, resulting in a rendered image at 110. Only after a full solution is computed in the particle shooting and meshing phases can an image be rendered. As meshing is performed for all surfaces in the entire scene, much time can be wasted processing images that are not seen by a user.

These conventional rendering processes work well for small amounts of data, but large or complex scenes can take hours or days to process before the image can be seen. This is a disadvantage for the user, who must wait for the final rendering. Moreover, if the resulting scene is not what the user wanted, then the process must be started over, wasting more time.

Additionally, CAD scenes comprise a number of different views. Because the scenes represent three-dimensional space, a user can view a scene from a number of different perspectives and can zoom into and out of a particular perspective. Conventional rendering based on particle tracing requires the user to wait for the entire scene to be rendered in order to see just one view.

Thus, there is a need for an improved rendering process that generates photorealistic images, while overcoming the shortcomings of conventional solutions and providing a solution with shortened processing time.

SUMMARY OF THE INVENTION

In an exemplary embodiment of the present invention a system, method and computer program product for particle tracing with on-demand meshing is disclosed.

By reordering the particle tracing calculations, it is possible, using the approach described by this invention, to render the initial image, or a set of images, in less time than by using the traditional approach.

In an exemplary embodiment, the present invention can be a method of rendering computer graphics comprising the steps of: processing a set of light particles in a scene to be rendered; selecting a view of the scene, the view comprising at least one surface, the surface comprising a plurality of pixels; selecting a pixel to render in the view; determining whether an illumination mesh already exists for a surface comprised of the selected pixel; computing an illumination mesh for the surface, when the illumination mesh does not already exist; and rendering the pixel with the illumination mesh.

In another exemplary embodiment, the present invention can be a system for rendering computer graphics comprising: means for processing a set of light particles in a scene to be rendered; means for selecting a view of the scene, the view comprising at least one surface, the surface comprising a plurality of pixels; means for selecting a pixel to render in the view; means for determining whether an illumination mesh already exists for a surface comprised of the selected pixel; means for computing an illumination mesh for the surface, when the illumination mesh does not already exist; and means for rendering the pixel with the illumination mesh.

In another exemplary embodiment, the present invention can be a computer useable information storage medium storing computer readable program code for causing a computer to perform the steps of: processing a set of light particles in a scene to be rendered; selecting a view of the scene, the view comprising at least one surface, the surface comprising a plurality of pixels; selecting a pixel to render in the view; determining whether an illumination mesh already exists for a surface comprised of the selected pixel; computing an illumination mesh for the surface, when the illumination mesh does not already exist; and rendering the pixel with the illumination mesh.

In another exemplary embodiment, the present invention can be a method for rendering a photorealistic computer image, comprising: obtaining scene data for the image; determining a visible portion of the image in a selected view; creating a view-dependent illumination mesh for only the visible portion; and rendering the visible portion of the image with the view-dependent illumination mesh.

In another exemplary embodiment of the invention, the present invention can be a method for rendering an image comprising obtaining scene data for a selected view; performing particle processing for the scene data; and rendering the selected view including performing meshing on demand for only pixels comprising the selected view.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Particle tracing, like radiosity, computes a view-independent, global lighting solution that includes all diffuse lighting effects, such as color bleeding. In addition, particle tracing accounts for all specular light effects including reflections, refractions and caustics.

Since the particle tracing solution generated is view-independent, it can be viewed from any vantage point, offering a full 3D solution that is well suited to interactive walkthroughs and animations. Because it also has the low memory overhead of ray tracing, particle tracing can be used to render very large designs.

Figure 1:
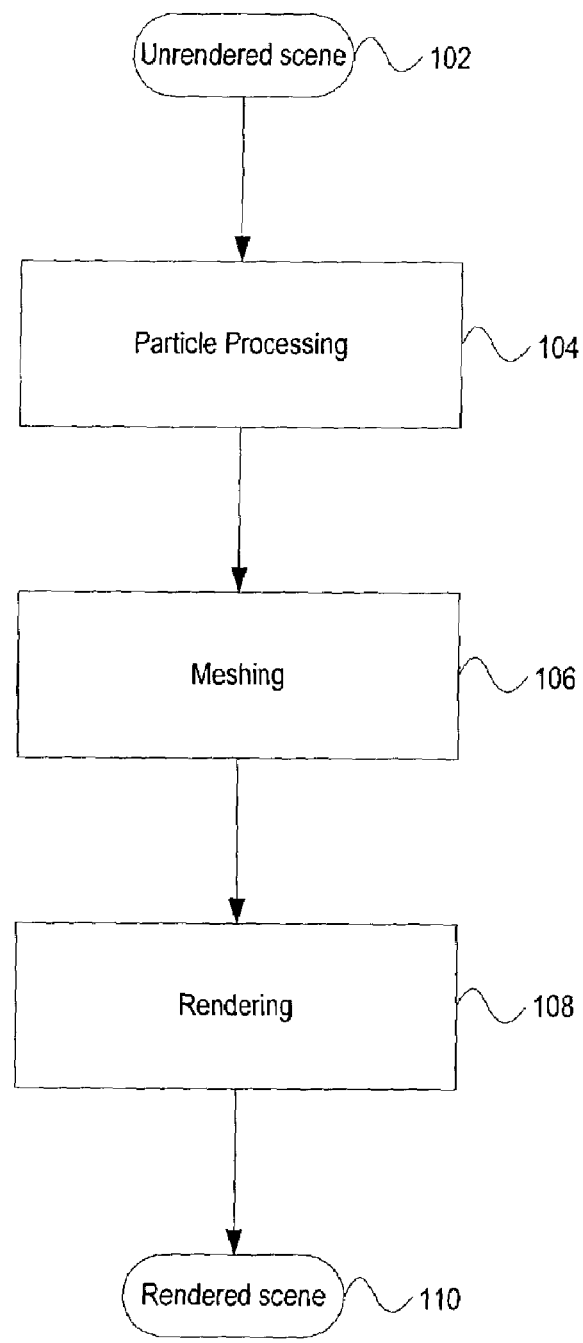
FIG. 1 depicts an exemplary embodiment of a conventional method of particle tracing rendering.

As described above in reference to FIG. 1, particle tracing works by calculating the paths of light particles as they are emitted from light sources and are reflected and transmitted throughout the scene. The conventional process typically occurs in three distinct phases: particle processing, meshing, and rendering. In conventional particle tracing, only after the particle processing and meshing phases are performed can rendering be done. As meshing is performed for surfaces that are not visible in the selected view, much time is wasted processing images that are not seen by a user.

Figure 2:
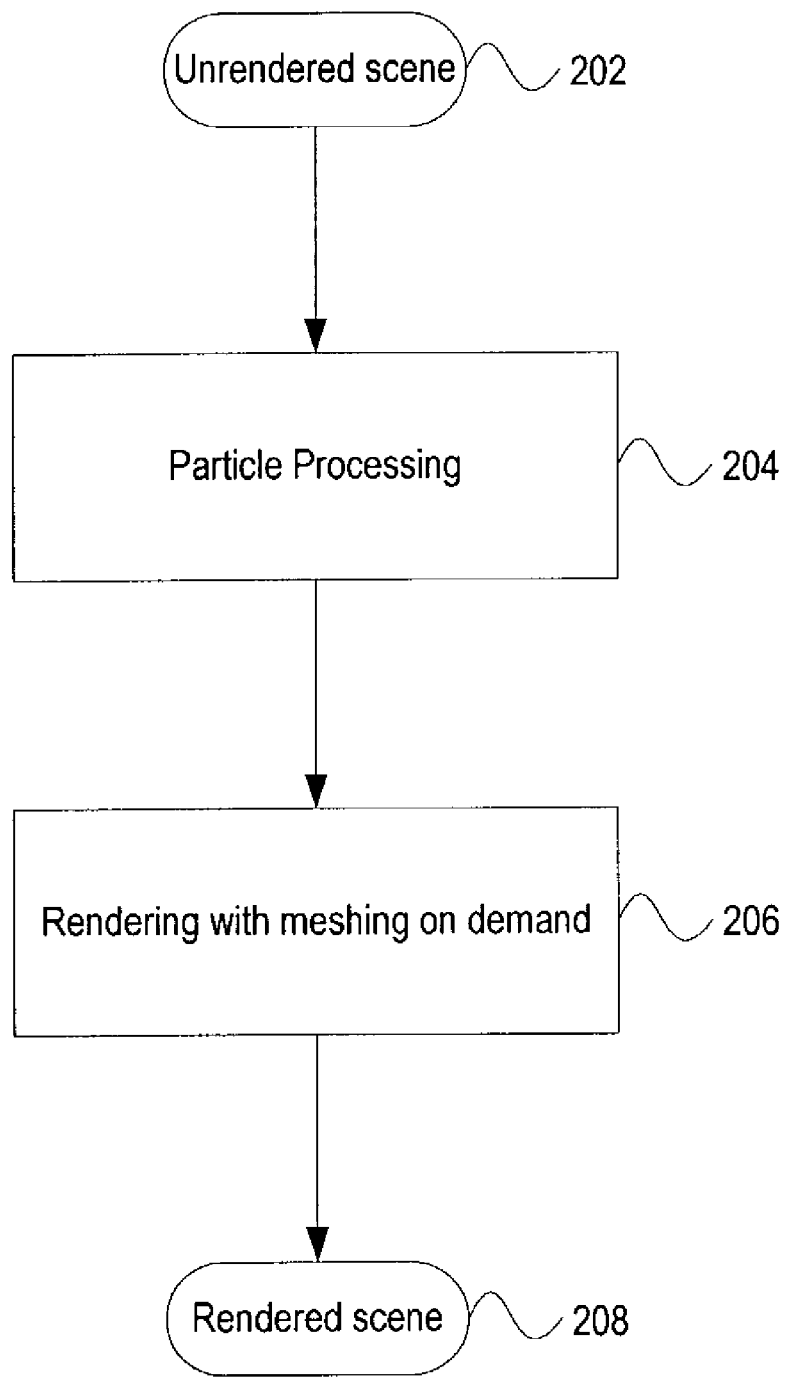
FIG. 2 depicts an exemplary embodiment of a method of particle tracing rendering according to the present invention.

Therefore, in an exemplary embodiment of the present invention, the conventional meshing step is eliminated and the particle tracing process becomes view-dependent. FIG. 2 illustrates a method according to an exemplary embodiment of the invention. The method may be implemented via a software program. The software program may be part of a CAD software program or a separate program.

A scene to be rendered is obtained in step 202. A user can input the scene. The system obtains data comprising the scene. The scene may be a CAD model created using applications such as, e.g., MicroStation® products, which are developed by Bentley Systems, Inc., Exton, Pa. U.S.A. and which combine a design tool with a rendering tool. This combination is advantageous because it eliminates the need for converting between the design tool file format and the rendering tool file format. Instead, the design tool provides a subset of the design data to the rendering tool, for example, data about an object's geometry, its surfaces and the material the object is made of. The rendering tool can then compile a database of just the data it needs to perform the rendering function.

The data for the scene to be rendered then enters the particle processing phase in step 204. Particle processing is done for the entire scene. During the particle processing phase, particles are emitted or "shot" from each of the light sources into the scene. The user may specify the total number of particles; the relative brightness of the light sources determines the number of particles shot by each source. These particles then are assigned to the various light sources in the model, according to the relative brightness of each light. That is, brighter lights are assigned more particles than dimmer lights.

The particle paths are traced through the scene, interacting with surfaces encountered along the way. Once a particle strikes a surface, it can either be absorbed or bounced. A bounce can either be a diffuse reflection, specular (mirror) reflection, diffuse transmission, or specular transmission (with refraction). Each time a particle is diffusely reflected, transmitted or absorbed, a hit point is recorded for that surface. These hits are preferably stored, for example in a disk file referred to as hit point file.

The material properties of each surface determine the relative probabilities of these interactions with the particles. These properties may be set by the user using the rendering tool. For example, a diffuse white surface with a diffuse setting of 0.7 and a specular setting 0.0 diffusely reflects 70 percent of the particles that hit it, and absorbs the remaining 30 percent. If the material's specular value is non-zero, a percentage of the particles are specularly reflected, and if the surface is partially transparent, some particles are transmitted as well.

For particles that are transmitted, the proportion that is distributed diffusely versus specularly (with refraction) is determined by the ratio of the diffuse and specular colors. For example, if a white surface has a diffuse value of 0.4, a specular value of 0.2, and a transparent value of 0.3, of the 30 percent of the particles that are transmitted, twice as many have a diffuse transmission as specular. Take for example, a white light shining on a red object. Light reflecting from the red object then will be tinted red. The red object, in effect, becomes a red light source, from this reflected light.

As mentioned above, the conventional separate meshing step is eliminated and rendering begins right away in step 206. Each image can be rendered using either ray tracing or smooth shading. In some cases, the smooth-shaded display is sufficient, since shadows and caustics are part of the particle-traced solution. Smooth shading can be faster than ray tracing, but does not include any of the specular effects, such as reflections, refractions, and specular highlights. When additional specular effects are desired, such as views with reflective or refractive objects, the final display can be ray-traced.

In an exemplary embodiment, rendering is performed by ray tracing. The process of ray tracing determines which pixels are visible in a given view. Instead of meshing the entire scene from all possible viewing angles, in the described embodiment, meshing is performed on-demand, i.e., only for the pixels in the view, rather than for the whole scene. This results in a rendered scene 208 much more quickly than with conventional methods.

Figure 3:
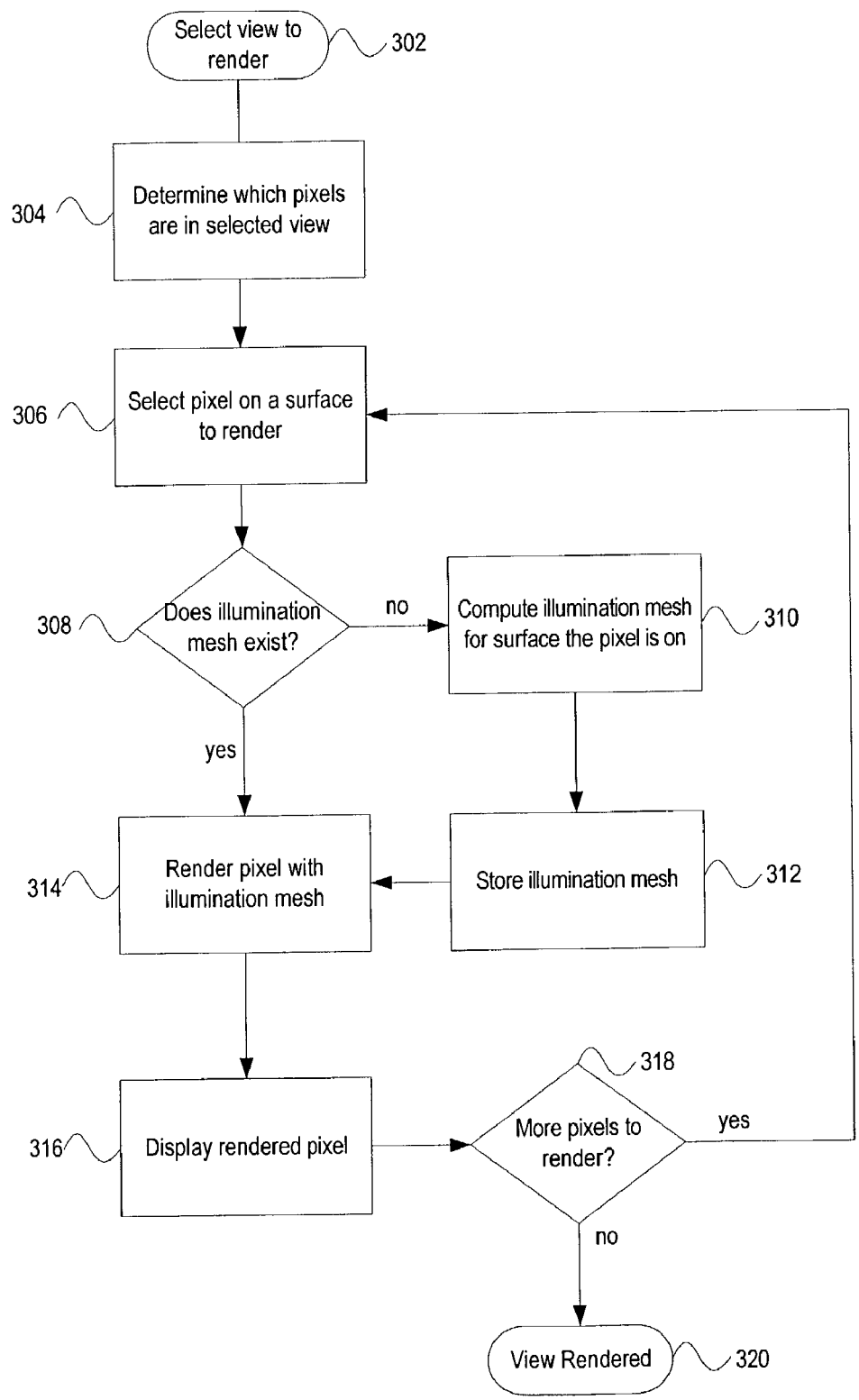
FIG. 3 depicts an exemplary embodiment of a method of rendering according to the present invention.

FIG. 3 shows the step 206 in more detail. When the user selects a view to be rendered in 302, ray tracing determines which part of the scene is visible, and which pixels are in the selected view in step 304. A pixel in the view of the scene is selected for rendering in step 306. Next, a determination is made whether or not an illumination mesh already exists for the surface or surfaces visible in the pixel in step 308. This includes all surfaces that contribute to the color of the pixel, not only those that are directly visible, but also those that are visible through reflection and refraction. If the illumination meshes for all of the relevant surfaces do exist, the pixel is rendered in step 314 using the existing meshes. These meshes might already exist for a pixel, for example, if a portion of the scene containing those surfaces had already been rendered. If one, or more, of these meshes does not exist, then it is computed in step 310.

In an exemplary embodiment, a mesh is computed by processing the hit points on each surface to determine the illumination of the surfaces. This is referred to as meshing, because the system stores this illumination information at select "mesh" points on each surface. At each pixel of the image, the illumination is computed by interpolating the nearest mesh point values. In some cases, a simple Gouraud-shaded display is sufficient.

In order to guarantee that a solution can always be redisplayed (if, for example, the design file changes), it is recommended that the solution be saved. This solution file, the design and the image files (e.g. pattern, bump, etc.) are all that are needed to re-display the solution at any point in the future. As such, the illumination solution is then stored for re-use in step 312.

Then the pixel is rendered using the illumination mesh at step 314. Rendering can be performed by methods known in the art, such as, for example, ray tracing. The rendered pixel is then displayed in step 312. If there are more pixels to render at step 318, another pixel is selected at step 306 and the process repeats. If there are no remaining pixels to render, the view has been rendered at 320. In this way, parts of the scene can be viewable much sooner than with conventional particle tracing rendering methods.

For example, suppose it takes twenty-four hours to compute an illumination solution for a large scene, plus twenty minutes to render each view of the scene using conventional methods. A view of the scene is usually a smaller sub-set of the entire scene. Using the method of the present invention, the first view of the scene can be viewable in four hours and twenty minutes. If the user zooms in on the view and renders again, no additional solution calculation is required, so the scene is ready to view in twenty minutes, after rendering. If the user then changes the view of the scene slightly, some additional time would needed to render the portion of the scene for which there was not yet an illumination solution, perhaps another hour and twenty minutes.

With conventional methods, viewing the two different portions of the scene would have required the twenty-four hours of solution calculation and forty minutes of rendering. With the method of the present invention, only five hours and forty minutes are required. If the entire scene is needed, the user can choose to have the illumination solution calculated first, prior to rendering, or the user can choose to have the initial view rendered, and then have the system complete the remaining solution for the scene. This allows the user to stop the rendering process early on if the scene is not correct, rather than having to wait until the entire scene was complete.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method of rendering computer graphics comprising the steps of:
    processing a set of light particles in a scene to be rendered;
    selecting a view of said scene, said view comprising at least one surface, said surface comprising a plurality of pixels;
    selecting a pixel to render in said view;
    rendering said pixel, and as said pixel is being rendered:
        determining whether a view-independent illumination mesh already exists for a surface visible in said selected pixel; and
        computing a view-independent illumination mesh for only said visible surface, when said illumination mesh does not already exist, wherein said view-independent illumination mesh is computed based on said processed set of light particles;
    wherein said pixel is rendered with said illumination mesh; and
    displaying said rendered pixel.

2. The method of claim 1, further comprising storing said illumination mesh for re-use.

3. The method of claim 1, wherein particle processing comprises determining hit points for a surface.

4. The method of claim 3, wherein performing view-independent meshing on demand comprises processing the hit points to determine an illumination of the surface.

5. The method of claim 1, wherein rendering comprises ray tracing.

6. The method of claim 1, further comprising receiving the selected view from a user.

7. A computer readable information storage medium storing computer readable program code for causing a computer to perform the steps of:
    processing a set of light particles in a scene to be rendered;
    selecting a view of said scene, said view comprising at least one surface, said surface comprising a plurality of pixels;
    selecting a pixel to render in said view;
    rendering said pixel with a view-independent illumination mesh; and
    as said pixel is being rendered:
        determining whether said view-independent illumination mesh already exists for a surface visible in said selected pixel; and
        computing said view-independent illumination mesh for only said visible surface, when said view-independent illumination mesh does not already exist, wherein said view-independent illumination mesh is computed based on said processed set of light particles.

8. The computer useable information storage medium of claim 7, causing the computer to perform the further step of storing said view-independent illumination mesh for re-use.

9. A computer-implemented method for rendering a photorealistic computer image, comprising:
    obtaining scene data for the image, wherein said scene data comprises a synthetic computer model;
    determining a visible portion of the image in a selected view;
    for each surface in said visible portion:
        computing a view-independent illumination mesh for only said visible surface by analyzing a set of light particles associated with said visible surface to determine illumination for one or more mesh points on said visible surface; and
        rendering only said visible portion of the image using said view-independent illumination mesh; and
    displaying said rendered visible portion of the image.

10. The method of claim 9, wherein rendering comprises ray tracing.

11. The method of claim 9, wherein the scene data includes pixels comprising the image.

12. The method of claim 11, wherein during the rendering step, performing meshing for only those surfaces visible within pixels in said selected view.

13. The method of claim 11 wherein the determining step comprises ray tracing to determine which parts of said image are visible in said selected scene.

14. The method of claim 11 further comprising stopping rendering once said selected view is displayed.

15. The method of claim 9, wherein said scene data is obtained from a computer aided design tool.

16. The method of claim 9, further comprising receiving the selected view as input from a user.

17. The method of claim 9, further comprising performing particle processing for the scene data.

18. The method of claim 17, wherein particle processing comprises determining hit points for a surface.

19. The method of claim 18, wherein creating the view-independent illumination mesh comprises processing the hit points to determine an illumination of the surface.

* * * * *